US012718496B2

(12) United States Patent
Kim

(10) Patent No.: US 12,718,496 B2
(45) Date of Patent: Aug. 25, 2026

(54) ELECTRONIC DEVICE AND METHOD FOR CONTROLLING THEREOF

(71) Applicant: SAMSUNG ELECTRONICS CO., LTD., Suwon-si (KR)

(72) Inventor: Heemin Kim, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 207 days.

(21) Appl. No.: 18/407,052

(22) Filed: Jan. 8, 2024

(65) Prior Publication Data

US 2024/0144615 A1 May 2, 2024

Related U.S. Application Data

(63) Continuation of application No. PCT/KR2023/011518, filed on Aug. 4, 2023.

(30) Foreign Application Priority Data

Oct. 17, 2022 (KR) ........................ 10-2022-0133079

(51) Int. Cl.
*G06T 19/00* (2011.01)
*G06F 3/04817* (2022.01)
(Continued)

(52) U.S. Cl.
CPC ........ *G06T 19/006* (2013.01); *G06F 3/04817* (2013.01); *G06F 16/951* (2019.01);
(Continued)

(58) Field of Classification Search
CPC ... G06T 19/006; G06T 17/00; G06F 3/04817; G06F 16/951; G06F 3/011; G06F 3/0484;
(Continued)

(56) References Cited

U.S. PATENT DOCUMENTS 7,775,885 B2 8/2010 Van Luchene et al.
8,230,045 B2 7/2012 Kawachiya et al.
(Continued)

FOREIGN PATENT DOCUMENTS

JP 2021-140767 A 9/2021
KR 10-0912264 B1 8/2009
(Continued)

OTHER PUBLICATIONS

International Search Report (PCT/ISA/210) issued by the International Searching Authority on Nov. 21, 2023 in International Application No. PCT/KR2023/011518.
(Continued)

*Primary Examiner* — Chong Wu
(74) *Attorney, Agent, or Firm* — Sughrue Mion, PLLC

(57) ABSTRACT

Provided is an electronic device and a method of controlling thereof. The electronic device includes a display, a communicator, a memory, and a processor configured to obtain a plurality of images corresponding to content being provided to the display, based on information corresponding to a preferred content of a user being obtained based on the plurality of images transmitted to a server through the communicator, control the display to provide a user interface (UI) for entering a metaverse space corresponding to the preferred content, and based on a user command for entering the metaverse space being input through the UI, control the display to display a screen based on data corresponding to the metaverse space received from the server through the communicator.

19 Claims, 11 Drawing Sheets

(51) Int. Cl.

| | |
|---|---|
| ***G06F 16/951*** | (2019.01) |
| ***G06Q 30/0241*** | (2023.01) |
| ***G06Q 30/0601*** | (2023.01) |
| ***G06T 17/00*** | (2006.01) |
| ***G06V 30/10*** | (2022.01) |

(52) U.S. Cl.
CPC ..... *G06Q 30/0241* (2013.01); *G06Q 30/0641* (2013.01); *G06T 17/00* (2013.01); *G06V 30/10* (2022.01)

(58) Field of Classification Search
CPC ........... G06Q 30/0241; G06Q 30/0641; G06Q 30/0277; G06V 30/10; G06V 10/82; G06V 10/28
See application file for complete search history.

(56) References Cited

U.S. PATENT DOCUMENTS 8,619,160 B2 12/2013 Woo et al.
9,338,200 B2 5/2016 Park et al.
2014/0019443 A1* 1/2014 Golshan ............. G06F 16/9535 707/723
2019/0208244 A1* 7/2019 Choi .................... H04N 21/262
2021/0275918 A1 9/2021 Devaranjan et al.

FOREIGN PATENT DOCUMENTS

KR 10-1037823 B1 5/2011
KR 10-1923723 B1 11/2018
KR 10-2019-0083552 A 7/2019
KR 10-2317223 B1 10/2021
KR 10-2365897 B1 2/2022
KR 10-2402170 B1 5/2022
KR 10-2415228 B1 6/2022
KR 10-2423080 B1 7/2022
WO 2014/011208 A2 1/2014

OTHER PUBLICATIONS

Written Opinion (PCT/ISA/237) issued by the International Searching Authority on Nov. 21, 2023 in International Application No. PCT/KR2023/011518.

* cited by examiner

FIG. 4

| User id | Content Title | View date |
| --- | --- | --- |
| A | AAA | 2022-07-01 14:00 |
| A | AAA | 2022-07-02 14:00 |
| A | BBB | 2022-07-03 14:00 |
| A | AAA | 2022-07-04 14:00 |
| A | CCC | 2022-07-05 14:00 |
| A | AAA | 2022-07-06 14:00 |
| A | BBB | 2022-07-07 14:00 |
| A | BBB | 2022-07-08 14:00 |
| A | DDD | 2022-07-09 14:00 |
| A | DDD | 2022-07-10 14:00 |
| A | CCC | 2022-07-11 14:00 |
| A | AAA | 2022-07-12 14:00 |
| A | EEE | 2022-07-13 14:00 |
| A | AAA | 2022-07-14 14:00 |

FIG. 5

| User id | Content Title | score | type | create date |
|---|---|---|---|---|
| A | AAA | 24 | OTT | 2022-07-01 14:00 |
| A | BBB | 23 | OTT | 2022-07-03 14:00 |
| A | DDD | 14 | game | 2022-07-04 14:00 |
| A | CCC | 8 | tv program | 2022-07-05 14:00 |
| A | EEE | 9 | game | 2022-07-06 14:00 |

ELECTRONIC DEVICE AND METHOD FOR CONTROLLING THEREOF

CROSS-REFERENCE TO RELATED APPLICATION(S)

This application is a continuation of International Application No. PCT/KR2023/011518, filed on Aug. 4, 2023, in the Korean Intellectual Property Receiving Office, which claims priority to Korean Patent Application No. 10-2022-0133079, filed on Oct. 17, 2022, in the Korean Intellectual Property Office, the disclosures of which are incorporated by reference herein in their entireties.

BACKGROUND

1. Field

The disclosure relates to an electronic device and a method for controlling thereof, and more particularly to an electronic device that provides various services through a metaverse space and a method for controlling thereof.

2. Description of Related Art

Recently, various services are being provided through a metaverse space which is a virtual space in which social, economic, and cultural activities may be performed, similar to in a real space. The metaverse space provides features such as presence, interoperability, and standardization.

However, although platforms that provide various metaverse spaces are becoming more prevalent, providing a service interconnected with an electronic device (e.g., smart television (TV), etc.) is not entirely satisfactory.

Accordingly, the service provided by the electronic device to provide user convenience by interconnecting the metaverse space with the service provided by the electronic device is inadequate in many aspects.

SUMMARY

According to an aspect of the disclosure an electronic device includes a display; a communicator; at least one memory; and at least one processor configured to: obtain a plurality of images corresponding to content being provided to the display, based on information corresponding to a preferred content of a user being obtained based on the plurality of images transmitted to a server through the communicator, control the display to provide a user interface (UI) for entering a metaverse space corresponding to the preferred content, and based on a user command for entering the metaverse space being input through the UI, control the display to display a screen based on data corresponding to the metaverse space received from the server through the communicator.

The metaverse space may be generated based on at least one image that is web crawled based on information about the preferred content.

The metaverse space may be generated by 3-dimensional (3D) modeling a background area from among the background area and an object area comprised in the at least one image, and comprises an avatar of an object comprised in the object area or an object image.

The metaverse space may include at least one from among a first area that includes information about a recommended content of the user, a second area that includes information about an advertisement content provided to the user, and a third area for purchasing goods.

The metaverse space may include a first avatar corresponding to the user and a second avatar corresponding to another user with a user profile that includes the preferred content.

The UI may be a home UI including at least one first icon corresponding to at least one image content, at least one second icon corresponding to at least one game content, at least one third icon corresponding to at least one application, and at least one fourth icon corresponding to at least one metaverse space, and wherein the user command for entering the metaverse space may be a user command selecting a fifth icon for a metaverse space corresponding to the preferred content from among the at least one fourth icon included in the home UI.

The preferred content may be determined, based on at least one playback content corresponding to the plurality of images being identified through the server, by preference information about the identified at least one playback content.

The server may be configured to: based on a playback content being a game content, obtain information about the game content by recognizing text included in an image through optical character recognition (OCR), and based on a playback content being an image content, obtain information about the image content by recognizing a title of an image content corresponding to an image through automatic content recognition.

The information about the identified playback content may be stored in a database, wherein preference information of the playback content may be obtained based on information about the at least one playback content stored in the database, and wherein the preference information of the playback content may include score information determined based on at least one from among a number of playback times and playback time of the at least one playback content.

According to an aspect of the disclosure, a control method of an electronic device includes obtaining a plurality of images corresponding to content being provided to a display of the electronic device; based on information corresponding to a preferred content of a user being obtained based on the plurality of images transmitted to a server, providing a user interface (UI) for entering a metaverse space corresponding to the preferred content; and based on a user command for entering the metaverse space being input through the UI, providing a screen based on data corresponding to the metaverse space received from the server.

The metaverse space may include at least one from among a first area that includes information about a recommended content of the user, a second area that includes information about an advertisement content provided to the user, and a third area for purchasing goods.

The metaverse space may include a first avatar corresponding to the user and a second avatar corresponding to another user with a user profile that includes the preferred content.

The metaverse space may include at least one from among a first area that includes information about a recommended content of the user, a second area that includes information about an advertisement content provided to the user, and a third area for purchasing goods.

The metaverse space may include a first avatar corresponding to the user and a second avatar corresponding to another user with a user profile that may include the preferred content.

The UI may be a home UI including at least one first icon corresponding to at least one image content, at least one second icon corresponding to at least one game content, at least one third icon corresponding to at least one application, and at least one fourth icon corresponding to at least one metaverse space, and wherein the user command for entering the metaverse space may be a user command selecting a fifth icon for a metaverse space corresponding to the preferred content from among the at least one fourth icon included in the home UI.

According to an aspect of the disclosure, an electronic device includes at least one memory; and at least one processor configured to: obtain a plurality of images corresponding to content being provided to a display, based on information corresponding to a preferred content of a user being obtained based on the plurality of images transmitted to a server, control the display to provide a user interface (UI) for entering a metaverse space corresponding to the preferred content, and based on a user command for entering the metaverse space being input through the UI, control the display to display a screen based on data corresponding to the metaverse space received from the server.

The metaverse space may be generated based on at least one image that is web crawled based on information about the preferred content.

The metaverse space may be generated by 3-dimensional (3D) modeling a background area from among the background area and an object area included in the at least one image, and the metaverse space may comprise an avatar of an object included in the object area or an object image.

The metaverse space may include at least one from among a first area that includes information about a recommended content of the user, a second area that includes information about an advertisement content provided to the user, and a third area for purchasing goods.

The metaverse space may include a first avatar corresponding to the user and a second avatar corresponding to another user with a user profile that includes the preferred content.

BRIEF DESCRIPTION OF THE DRAWINGS

The above and other aspects, features, and advantages of embodiments of the disclosure will be more apparent from the following description taken in conjunction with the accompanying drawings, in which:

FIG. 4 is a diagram illustrating a content playback record stored in a log database, according to one or more embodiments;

FIG. 5 is a diagram illustrating a user profile that includes information about playback content, according to one or more embodiments;

DETAILED DESCRIPTION

Figure 1:
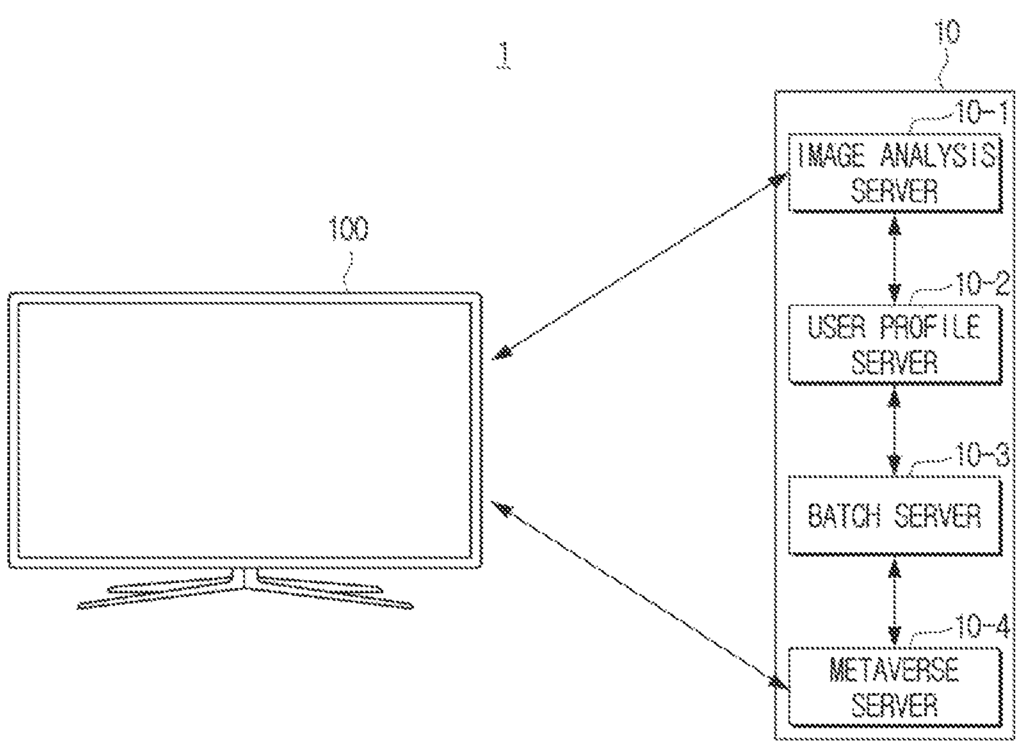
FIG. 1 is a diagram illustrating a system for providing a metaverse space, according to one or more embodiments.

One or more embodiments of the disclosure may be described herein. However, it should be noted that the various embodiments are not for limiting the scope of the disclosure to a specific embodiment, but should be interpreted to include all modifications, equivalents and/or alternatives of the embodiments.

In the disclosure, expressions such as "have," "may have," "include," "may include," or the like are used to designate a presence of a corresponding characteristic (e.g., elements such as numerical value, function, operation or component), and not to preclude a presence or a possibility of additional characteristics.

In the disclosure, expressions such as "A or B," "at least one of A and/or B," or "one or more of A and/or B" may include all possible combinations of the items listed together. For example, "A or B," "at least one of A and B," or "at least one of A or B" may refer to all cases including (1) at least one A, (2) at least one B, or (3) both of at least one A and at least one B.

Expressions such as "first," "second," "1st," "2nd," or so on used herein may be used to refer to various elements regardless of order and/or importance, and may be used only to distinguish one element from another element, without limiting the corresponding elements. For example, a first user device and a second user device may indicate different user devices, regardless of order and importance. For example, a first element may be denoted as a second element, and similarly a second element may also be denoted as a first element without departing from the scope of the disclosure.

Terms such as "module," "unit," or "part" used in the disclosure may be terms for designating an element performing at least one function or operation, and the elements may be implemented with a hardware or software, or a combination of hardware and software. In addition, a plurality of "modules," a plurality of "units," or a plurality of "parts," except for when each thereof needs to be implemented to a separate specific hardware, may be integrated to at least one module or chip and implemented in a processor.

When a certain element (e.g., first element) is indicated as being "(operatively or communicatively) coupled with/to" or "connected to" another element (e.g., second element), it may be understood as the certain element being directly coupled with/to the another element or as being coupled through other element (e.g., third element). On the other hand, when a certain element (e.g., first element) is indicated as "directly coupled with/to" or "directly connected to" another element (e.g., second element), it may be understood as the other element (e.g., third element) not being present between the certain element and the another element.

The expression "configured to . . . (or set up to)" used in the disclosure may be used interchangeably with, for example, "suitable for . . . ," "having the capacity to . . . ,"

"designed to . . . ," "adapted to . . . ," "made to . . . ," or "capable of . . . " based on circumstance. The term "configured to . . . (or set up to)" may not necessarily mean "specifically designed to" in terms of hardware. Rather, in a certain circumstance, the expression "a device configured to . . . " may mean something that the device "may perform . . . " together with another device or components. For example, the phrase "a processor configured to (or set up to) perform A, B, or C" may mean a dedicated processor for performing a corresponding operation (e.g., embedded processor), or a generic-purpose processor (e.g., a central processing unit (CPU) or an application processor) capable of performing the corresponding operations by executing one or more software programs stored in a memory device.

The terms used herein have merely been used to describe a specific embodiment, and not intended to limit the scope of another embodiment. A singular expression includes a plural expression, unless otherwise specified. The terms used in the disclosure, including technical or scientific terms, may have the same meaning as the terms generally understood by those of ordinary skill in the related field of art. Of the terms used herein, the terms which are defined in a typical dictionary may be interpreted to meanings identical or similar to the contextual meanings thereof in the related art. Unless clearly defined otherwise, the terms may not be interpreted to ideal or excessively formal meanings. In some cases, even if the term is defined in the disclosure, the terms may not be interpreted to exclude the embodiments of the disclosure.

The disclosure will be described in greater detail below with reference to the accompanying drawings. However, in describing the disclosure, in case it is determined that the detailed description of related known technologies may unnecessarily confuse the gist of the disclosure, the detailed description thereof will be omitted. With respect to the description of the drawings, like reference numerals may be used to indicate like elements.

The disclosure will be described in greater detail below with reference to the accompanied drawings.

FIG. 1 is a diagram illustrating a system for providing a metaverse space, according to one or more embodiments. As shown in FIG. 1, a system 1 may include an electronic device 100 and at least one server 10. At this time, the at least one server 10 may include an image analysis server 10-1, a user profile server 10-2, a batch server 10-3, and a metaverse server 10-4. According to one or more embodiments, the electronic device 100 may be implemented as a television (TV) as shown in FIG. 1, but this is merely one embodiment, and may be implemented as various electronic devices such as, for example, and without limitation, a set top box, a smartphone, a tablet personal computer (PC), a notebook PC, a desktop PC, and the like.

The electronic device 100 may obtain a plurality of images that correspond to content being output to a display part 110 (e.g., display) of the electronic device 100. Specifically, the electronic device 100 may obtain the plurality of images by capturing a screen being output to the display part of the electronic device 100 while playing back a plurality of content (e.g., broadcast content, movie content, game content, etc.).

Then, the electronic device 100 may transmit the obtained plurality of images to the image analysis server 10-1 (or, referred to as a "first server").

The image analysis server 10-1 may obtain information about a playback content played back by a user based on the plurality of images, and store information about the user and information about the playback content in a log database (or database). That is, the image analysis server 10-1 may store information about the playback content played back by the user by matching the information with the user. At this time, the information about the playback content may include information about a title of a playback content, information about a playback time, and the like.

The user profile server 10-2 (or, referred to as a "second server") may obtain information about a preferred content of the user based on information stored in the log database. That is, the user profile server 10-2 may identify the preferred content of the user from among the playback contents based on information about the playback content, and obtain information about the identified preferred content.

The batch server 10-3 (or, referred to as a "third server") may obtain at least one image associated with the preferred content in order to generate a metaverse space. Specifically, the batch server 10-3 may obtain at least one image by performing web crawling based on the information about the preferred content of the user.

The metaverse server 10-4 (or, referred to as a "fourth server") may generate a metaverse space based on the obtained at least one image. That is, the metaverse server 10-4 may separate a background area from among the obtained at least one image, and generate a metaverse space through a 3-dimensional (3D) modeling of the separated background area. At this time, the metaverse space may be a virtual reality world generated based on the preferred content of the user, and may provide not only information about the preferred content, but also recommended content and advertisement content through the metaverse space. In addition, a communication service between a plurality of users that share the preferred content through the metaverse space may be provided.

After the metaverse space is generated, the electronic device 100 may output a user interface (UI) for entering the metaverse space corresponding to the preferred content. At this time, the UI may be a home UI through which one from among a broadcast content, a game content, an application, or a metaverse space may be entered.

When a user command for entering the metaverse space is input through the UI, the electronic device 100 may connect to the metaverse server 10-4 in which the metaverse space is generated and receive data about the metaverse space, and output a screen based on the received data.

Accordingly, the electronic device 100 may not only check information about the preferred content, but also receive advertisement content and recommended content through the metaverse space. In addition, communication with another user may be performed through an avatar which corresponds to the user. Additionally, from a business standpoint, increase in utilization rate of broadcast content and game content may be expected, and profit from advertisement and sales of goods may be increased within the metaverse space.

In the above-described embodiment, the system 1 has been described as including the image analysis server 10-1, the user profile server 10-2, the batch server 10-3, and the metaverse server 10-4 separately, but this merely one embodiment, and at least two servers may be implemented as one server. For example, the image analysis server 10-1 and the user profile server 10-2 may be implemented as one server, and the batch server 10-3 and the metaverse server 10-4 may be implemented as one server. Alternatively, four servers 10-1 to 10-4 may be implemented as one server.

Figure 2:
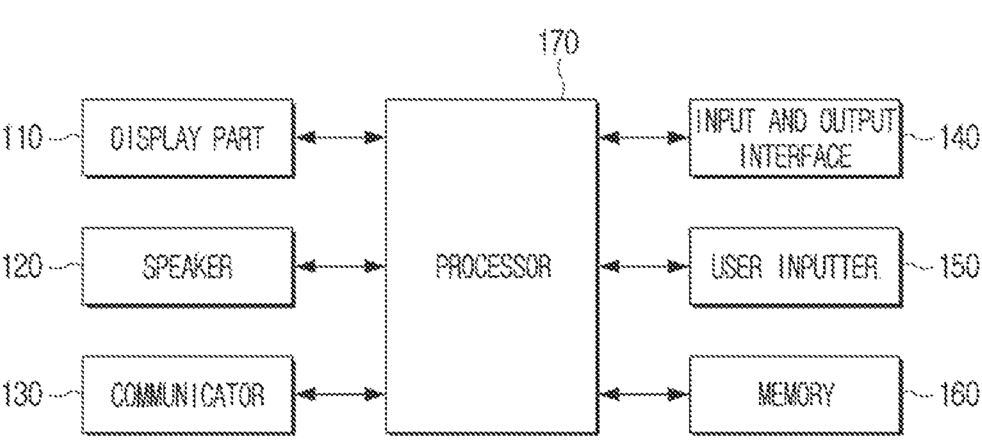
FIG. 2 is a block diagram illustrating a configuration of an electronic device, according to one or more embodiments.

FIG. 2 is a block diagram illustrating a configuration of an electronic device, according to one or more embodiments. As shown in FIG. 2, the electronic device 100 may include the display part 110, a speaker 120, a communicator 130, an input and output interface 140, a user inputter 150, a memory 160, and a processor 170. The configuration of the electronic device 100 shown in FIG. 1 is merely one embodiment, and some configurations may be added or omitted according to a type of the electronic device 100.

The display part 110 may output various information. Specifically, the display part 110 may output content provided from various sources. For example, the display part 110 may output a broadcast content received from the outside, output a game content received through a game server, and output a broadcast content or a game content received from an external device (e.g., set-top box, gaming console, etc.) connected through the input and output interface 140.

The display part 110 may output the UI for entering the metaverse space. At this time, the UI may be the home UI through which broadcast content, game content, applications, metaverse spaces, and the like may be entered.

When the user command for entering the metaverse space is input, the display part 110 may output a screen of the metaverse space.

The display part 110 may be implemented as a liquid crystal display (LCD) panel, organic light emitting diodes (OLED), and the like, and the display part 110 may also be implemented as a flexible display, a transparent display, and the like according to circumstance. However, the display part 110 according to the disclosure is not limited to the types specified above.

The speaker 120 may output various voice messages and audio. Specifically, the speaker 120 may output audio of various content. At this time, the speaker 120 may be provided inside the electronic device 100, but this is merely one embodiment, and may be electrically connected with the electronic device 100 by being provided outside the electronic device 100.

The communicator 130 may include at least one circuitry and perform communication with an external device of various types or a server. The communicator 130 may include at least one from among a Bluetooth Low Energy (BLE) module, a Wi-Fi communication module, a cellular communication module, a 3rd Generation (3G) mobile communication module, a 4th Generation (4G) mobile communication module, a 4G Long Term Evolution (LTE) communication module, and a 5th Generation (5G) mobile communication module.

Specifically, the communicator 130 may transmit a plurality of capture images to the image analysis server 10-1. The communicator 130 may receive information (e.g., screen of the metaverse space, etc.) about the metaverse space by connecting to the metaverse server 10-4.

The input and output interface 140 may be a configuration for inputting and outputting at least one from among an audio signal and an image signal. In an example, the input and output interface 140 may be a High Definition Multimedia Interface (HDMI), but this is merely one embodiment, and may be any one interface from among a Mobile High-Definition Link (MHL), a Universal Serial Bus (USB), a Display Port (DP), a Thunderbolt, a Video Graphics Array (VGA) port, a RGB port, a D-subminiature (D-SUB), or a Digital Visual Interface (DVI). According to one or more embodiments, the input and output interface 140 may be implemented including a port for inputting and outputting only audio signals and a port for inputting and outputting only image signals as separate ports, or as one port through which both the audio signals and the image signals are input and output.

Specifically, the electronic device 100 may receive broadcast content or game content from an external device through the input and output interface 140.

The user inputter 150 may include circuitry, and the processor 170 may receive a user command for controlling an operation of the electronic device 100 through the user inputter 150. Specifically, the user inputter 150 may be implemented as a remote controller, but this is merely one embodiment, and may be formed as a configuration such as a touch screen, a button, a keyboard, a mouse, and the like.

The user inputter 150 may include a microphone capable of receiving a user voice. If the user inputter 150 is implemented as a microphone, the microphone may be provided inside the electronic device 100. However, this is merely one embodiment, and the user voice may be received through a remote controller for controlling the electronic device 100 or a portable terminal (e.g., smart phone, AI speaker, etc.) installed with a remote controller application for controlling the electronic device 100. At this time, the remote controller or the portable terminal may transmit information about the user voice to the electronic device 100 through Wi-Fi, Bluetooth, infrared communication method, and the like. At this time, the electronic device 100 may include a plurality of communicators for communication with the remote controller or the portable terminal. The electronic device 100 may be may be configured such that the communicator communicating with the server and the communicator communicating with the remove controller (or portable terminal) are of different types from each other (e.g., communication may be performed with the server through an Ethernet model and Wi-Fi, and communication may be performed with the remote controller or the portable terminal through Bluetooth), but this is merely one embodiment, and may be of the same type (e.g., Wi-Fi).

Specifically, the user inputter 150 may receive input of a user command for outputting the UI for entering the metaverse space, a user command selecting an icon for entering the metaverse space from among a plurality of icons included in the UI, and the like.

The memory 160 may store an operating system (OS) for controlling the overall operation of elements of the electronic device 100 and instructions or data associated with the elements of the electronic device 100. Specifically, the memory 160 may store various modules for providing the metaverse space.

The memory 160 may be implemented as a non-volatile memory (e.g., hard disk, solid state drive (SSD), flash memory), a volatile memory (memory within the processor 170 may also be included), and the like.

The processor 170 may control the electronic device 100 according to at least one instruction stored in the memory 160. Specifically, the processor 170 may obtain a plurality of images corresponding to the content being output to the display part 110. Then, when information corresponding to the preferred content of the user is obtained based on the plurality of images transmitted to the server through the communicator 130, the processor 170 may control the display part 110 to output the UI for entering the metaverse space corresponding to the preferred content. When the user command for entering the metaverse space is input through the UI, the processor 170 may control the display part 110 to output a screen based on data corresponding to the metaverse space received from the server through the communicator 130.

At this time, the metaverse space may be generated based on at least on image that is web crawled based on information about the preferred content. Specifically, the metaverse space may be generated by 3D modeling the background area from among the background area and an object area included in the web crawled at least one image. At this time, the metaverse space may include an avatar or an object image of the object included in the object area. That is, by generating the metaverse space using the preferred content, a sense of immersion of the metaverse space may be provided to the user.

The metaverse space may include at least one from among a first area which includes information about the recommended content of the user, a second area which includes information about the advertisement content provided to the user, and a third area for purchasing goods. Thereby, a service provider that provides the metaverse space may be able to provide various services associated with the preferred content through the metaverse space.

The metaverse space may include a first avatar corresponding to the user and a second avatar corresponding to another user that has a user profile that includes the preferred content. The user of the electronic device 100 may perform communication with other users through the avatar.

The UI for entering the metaverse space may be the home UI including at least one first icon corresponding to at least one image content, at least one second icon corresponding to at least one game content, a third icon corresponding to at least one application, and at least one fourth icon corresponding to at least one metaverse space. Then, the user command for entering the metaverse space may be a user command selecting a fourth icon for the metaverse corresponding to the preferred content from among the at least one fourth content included in the home UI.

When at least one playback content corresponding to the plurality of capture images is identified through the server (i.e., image analysis server 10-1), the preferred content may be determined by preference information about the identified at least one playback content. At this time, if the playback content is a game content, the server 10-1 may obtain information about the game content by recognizing text included in the capture image through Optical Character Recognition (OCR). If the playback content is an image content, the server 10-1 may obtain information about the image content by recognizing a title of the image content corresponding to the capture image through Automatic Content Recognition (ACR).

Then, information about the identified playback content may be stored in the log database, and the server 10-2 may obtain the preference information of the playback content based on information about the at least one playback content stored in the log database. At this time, the server 10-2 may obtain the preference information including score information calculated based on at least one from among a number of playback times and playback time of the at least one playback content, and determine the preferred content through the score information of the at least one content.

Figure 3:
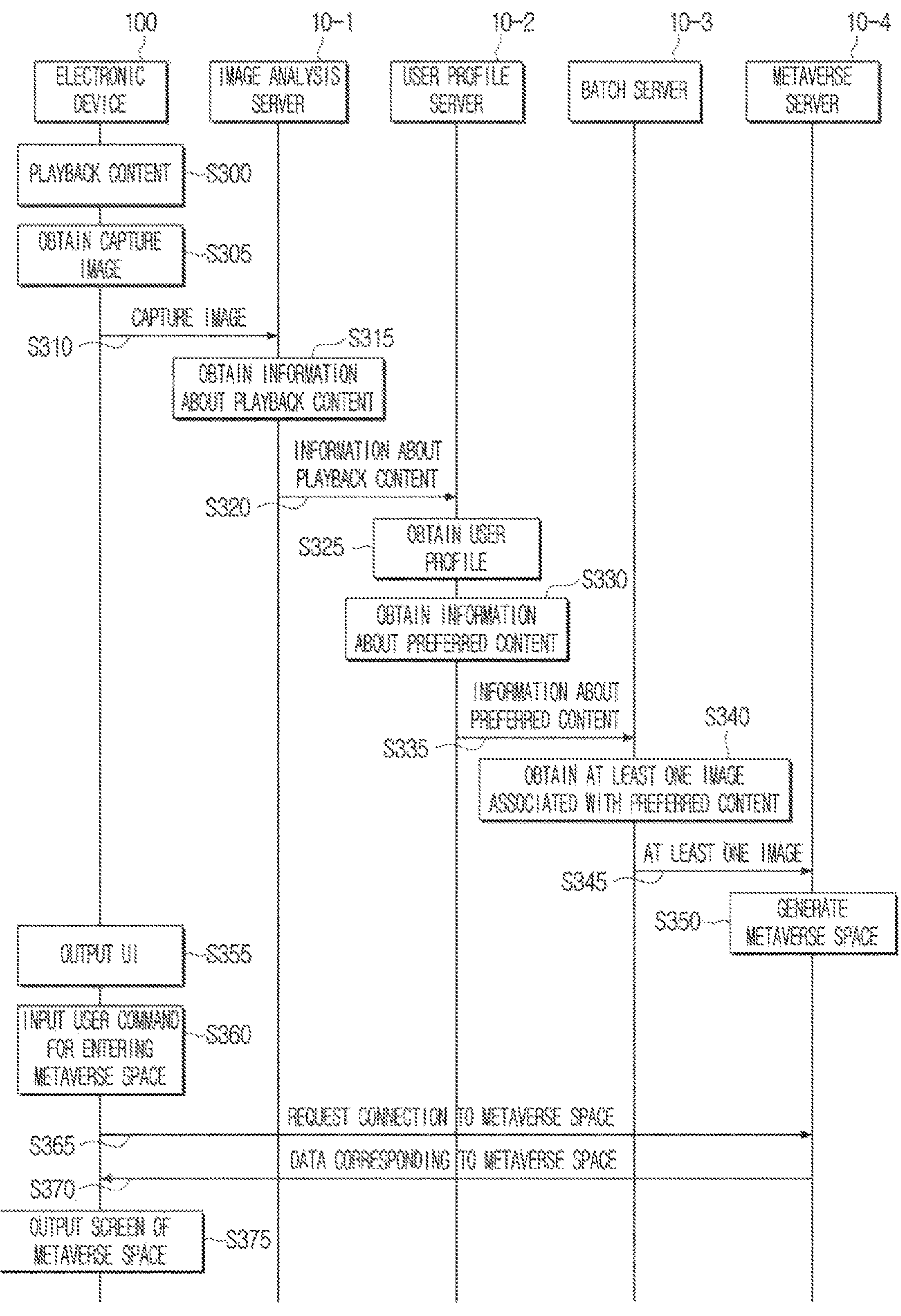
FIG. 3 is a sequence diagram illustrating a method for providing a metaverse space by a system, according to one or more embodiments.

FIG. 3 is a sequence diagram illustrating a method for providing a metaverse space by a system, according to one or more embodiments.

The electronic device 100 may first playback content (S300). Specifically, the electronic device 100 may playback broadcast content provided by a broadcast company or through an Over the Top (OTT). Alternatively, the electronic device 100 may playback a game content through a game platform which can recommend and playback a plurality of game content. Alternatively, the electronic device 100 may playback the broadcast content or the game content received from the external device (e.g., set-top box, gaming console, etc.) through the input and output interface 140.

The electronic device 100 may obtain a capture image by capturing a content screen that is output to the display part 110 while a content is being played back (S305). At this time, the electronic device 100 may start to capture the screen when the content is started to be played back. The electronic device 100 may capture the screen at pre-set periods (e.g., 1 second to 30 seconds) while the content is being played back. At this time, the pre-set period may be determined according to network circumstance. Although the electronic device 100 may obtain a plurality of images by capturing the screen being output to the display part 110, this is merely one embodiment, and may obtain at least one image corresponding to the content that is currently being output through other methods such as thumbnail images, and the like.

The electronic device 100 may transmit the capture image to the image analysis server 10-1 (S310). At this time, the electronic device 100 may transmit not only the capture image, but also identification information about the user of the electronic device 100 (e.g., ID, nickname, etc.) and information about time at which the capture image is captured (e.g., timestamp information) together therewith. The electronic device 100 may transmit the capture image to the image analysis server 10-1 each time the screen is captured, but this is merely one embodiment, and may store the capture image after the screen is captured for a certain time (e.g., 10 minutes, etc.), and transmit the stored plurality of capture images to the image analysis server 10-1.

The image analysis server 10-1 may obtain information about the playback content based on the capture image (S315). At this time, the information about the playback content may be included with title information of the playback content, information about playback time of the playback content, and the like.

Specifically, if the playback content is a game content, the image analysis server 10-1 may obtain information about the game content by recognizing the text included in the capture image through OCR. For example, the image analysis server 10-1 may recognize the text included in the image that captured the screen being loaded by performing OCR of the image that captured the screen being loaded when the game content is started from among the plurality of capture images. Then, the image analysis server 10-1 may obtain title information about the game content based on the recognized text. If the playback content is an image content, the image analysis server 10-1 may recognize the title of the image content corresponding to the capture image through ACR. Then, the image analysis server 10-1 may obtain title information about the image content based on the recognized title of the image content.

Then, the image analysis server 10-1 may match information about the user and information about the playback content, and store in the log database. For example, the image analysis server 10-1 may match, as shown in FIG. 4, user ID information, title information of the playback content, and information about the playback time of the playback content and store in the log database.

The image analysis server 10-1 may provide information about the playback content to the user profile server 10-2 (S320). At this time, the image analysis server 10-1 may transmit information about the playback content to the user profile server 10-2, but this is merely one embodiment, and the user profile server 10-2 may access information about the playback content stored in the log database of the image analysis server 10-1 and obtain information about the playback content.

The user profile server 10-2 may obtain a user profile based on information about the playback content (S325). At this time, the user profile server 10-2 may analyze information about a plurality of playback content for each user and obtain preference information about the playback content for each user. At this time, the preference information may include score information calculated based on at least one from among a number of playback times and playback time of the at least one playback content. That is, the user profile server 10-2 may calculate a high score if the number of playback times is high or as playback time is longer, and calculate a low score if the number of playback times is low or as the playback time is shorter. The user profile server 10-2 may also calculate the score taking into further consideration information about an immersive degree of a content (e.g., whether a user is viewing playback content, whether there is zapping of the content, and the like through a camera provided in the electronic device 100) in addition to the number of playback times or the playback time. FIG. 5 is a diagram illustrating a user profile that includes information about playback content according to one or more embodiments. In the user profile, as shown in FIG. 5, user identification information (ID information), title information of the playback content, score information, information about a type of the playback content, and time information added to the user profile may be matched and stored. Then, the user profile server 10-2 may store, as shown in FIG. 5, the generated information about the user profile in a profile database.

The user profile server 10-2 may obtain information about the preferred content based on the preference information (S330). At this time, the user profile server 10-2 may obtain information about the preferred content based on the score information included in the preference information. Specifically, the user profile server 10-2 may determine the playback content that exceeded a threshold value from among the playback contents as the preferred content, and obtain information about the determined preferred content. For example, the user profile server 10-2 may determine "AAA" content and "BBB" content which are playback contents that exceed 20, which is the threshold value, as the preferred content from among the playback contents stored in the user profile shown in FIG. 5. At this time, the threshold value may be a pre-set value, and may be set differently according to the user. For example, the threshold value may be set low to a user who uses a metaverse service frequently, and the threshold value may be set high to a user who does not use the metaverse service frequently.

The user profile server 10-2 may provide information about the preferred content to the batch server 10-3 (S335). Before performing step S335, the user profile server 10-2 may transmit information about the preferred content to the metaverse server 10-4. The metaverse server 10-4 may first identify whether there is a metaverse space corresponding to the preferred content obtained by the user profile server 10-2 present. If there is a metaverse space corresponding to the preferred content present, step S335 to step S350 may be omitted. However, if there is no metaverse space corresponding to the preferred content present, the metaverse server 10-4 may request at least one image of the preferred content to be provided to the batch server 10-3 to generate the metaverse space. Accordingly, the batch server 10-3 may access the user profile server 10-2 to obtain information about the preferred content to generate the metaverse space.

The batch server 10-3 may obtain at least one image associated with the preferred content (S340). Specifically, the batch server 10-3 may obtain title information about the preferred content, and a search string including pre-set characters (e.g., memorable scene, highlight, etc.) for obtaining the obtained title information and a representative image. For example, if "AAA content" has been determined as the preferred content, the batch server 10-3 may obtain a search string of {AAA+memorable scene} or {AAA+highlight}.

Then, the batch server 10-3 may perform web crawling based on the obtained search string, and obtain an image list including a plurality of images obtained through web crawling. Then, the batch server 10-3 may obtain one image (or representative image) from among the image list. Specifically, the batch server 10-3 may obtain an image that is most frequently searched from among the image list as the representative image. For example, the batch server 10-3 may obtain the representative image based on a sudo code as shown below.

```
1. identify same image for each image from image list (similarity 95%)
    [Comparing Histogram] - identify background, [Feature matching] - identify object
    2. if identified as same image count and load to memory queue
    3. define content with largest count in loaded queue as representative image
    ===== sudo code ====
    for I=1 to Image_list_end do
    for j=i+1 to image_list_end do
    compare image_list[i] and image_list[j]
    if ( histogram result + feature result )/2 >= 95
        memory_queue[i].count += 1
        endif
      endfor
    endfor
    Representative image = check_bigCount_image (memory_queue)
```

Alternatively, the batch server 10-3 may obtain one image from among the image list based on metadata of an image such as an image resolution, an image size, and an image sharpness in addition to a number of image searches. In the above-described embodiment, the batch server 10-3 has been described as obtaining one image, but this is merely one embodiment, and may obtain a plurality of images of a pre-set number for the 3D modeling.

The batch server 10-3 may transmit the obtained at least one image to the metaverse server 10-4 (S345).

The metaverse server 10-4 may generate a metaverse space based on the obtained at least one image (S350).

Figure 6:
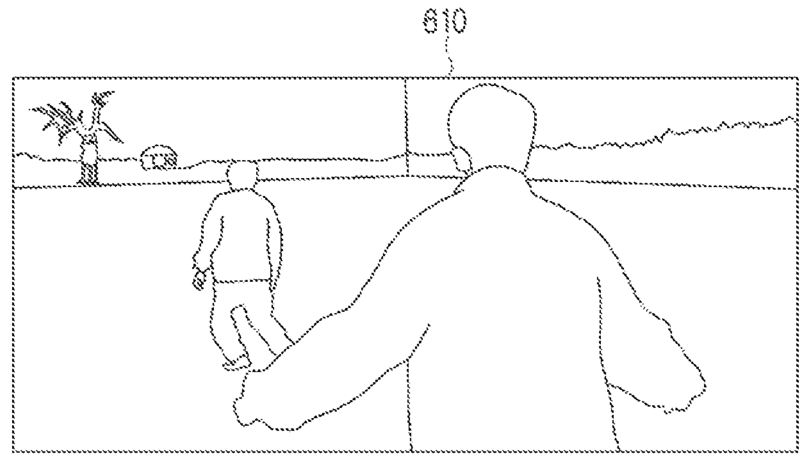
FIG. 6 is a diagram illustrating a method of separating a background area and an object area from at least one image, according to one or more embodiments.
Figure 6:
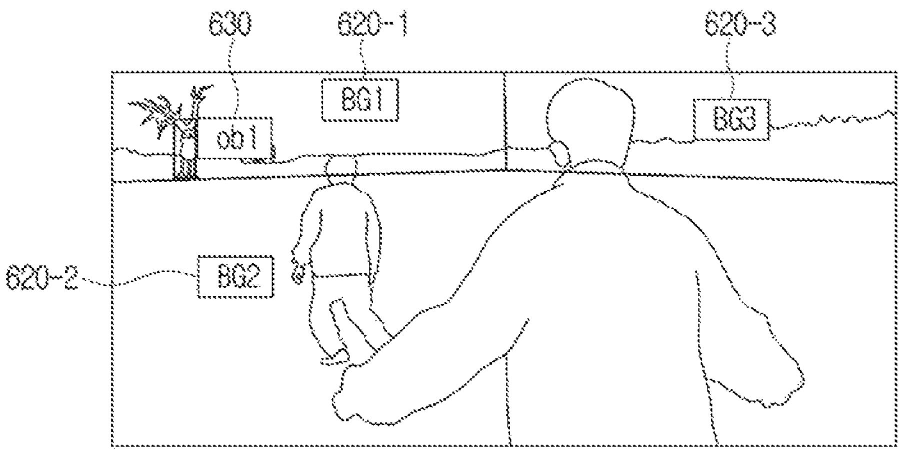

Specifically, the metaverse server 10-4 may divide the obtained at least one image into the background area and the object area. According to one or more embodiments, the metaverse server 10-4 may separate the background area and the object area by analyzing a focal point of the obtained at least one image. In another example, the metaverse server 10-4 may obtain information about the background area and the object area by inputting at least one image in a neural network model trained to separate the background area and the object area. For example, the metaverse server 10-4 may input a first image 610 shown on the left side of FIG. 6 in a trained neural network model and separate the background area and the object area, and obtain a first to third background areas 620-1 to 620-3 and an object area 630 as shown on the right side of FIG. 6.

Figure 7:
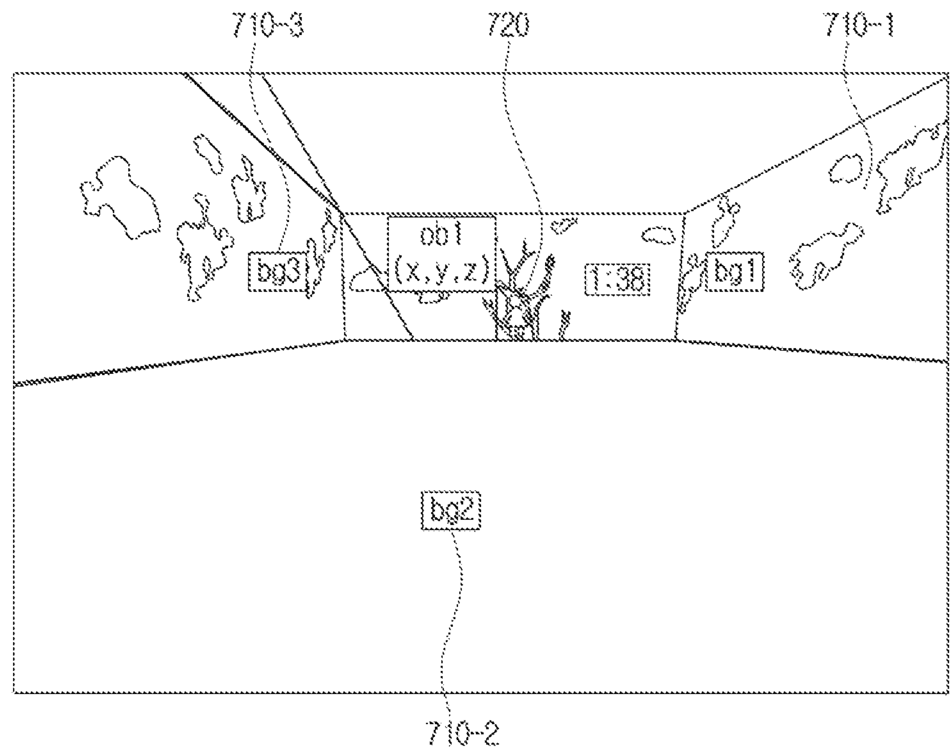
FIG. 7 is a diagram illustrating a metaverse space generated by performing 3D remodeling of a background area separated from at least one image, according to one or more embodiments.

Then, the metaverse server 10-4 may generate a metaverse space which is a 3D image of the at least one image by performing 3D modeling based on the separated background area and the object area. At this time, the metaverse server 10-4 may generate a metaverse space which is a 3D image by inputting the separated background area in the trained neural network model to generate the 3D image. For example, the metaverse server 10-4 may generate a metaverse space that includes a plurality of background areas 710-1 to 710-3 as shown in FIG. 7 by inputting the separated background areas 620-1 to 620-3 in the neural network model as shown at the right side of FIG. 6A. Then, the metaverse server 10-4 may set one area of the metaverse space generated by the background area as an object area 720, and display an object image or an avatar corresponding to the object at coordinates (x,y,z) set as the object area 720.

In the above-described embodiment, the at least one image has been described as being separated into the background area and the object area and used to generate a metaverse space through 3D modeling, but this is merely one embodiment, and the metaverse server 10-4 may not separate the object area and the background area included in the at least one image, and generate a metaverse space by inputting the at least one image directly in the trained neural network model.

Figure 8:
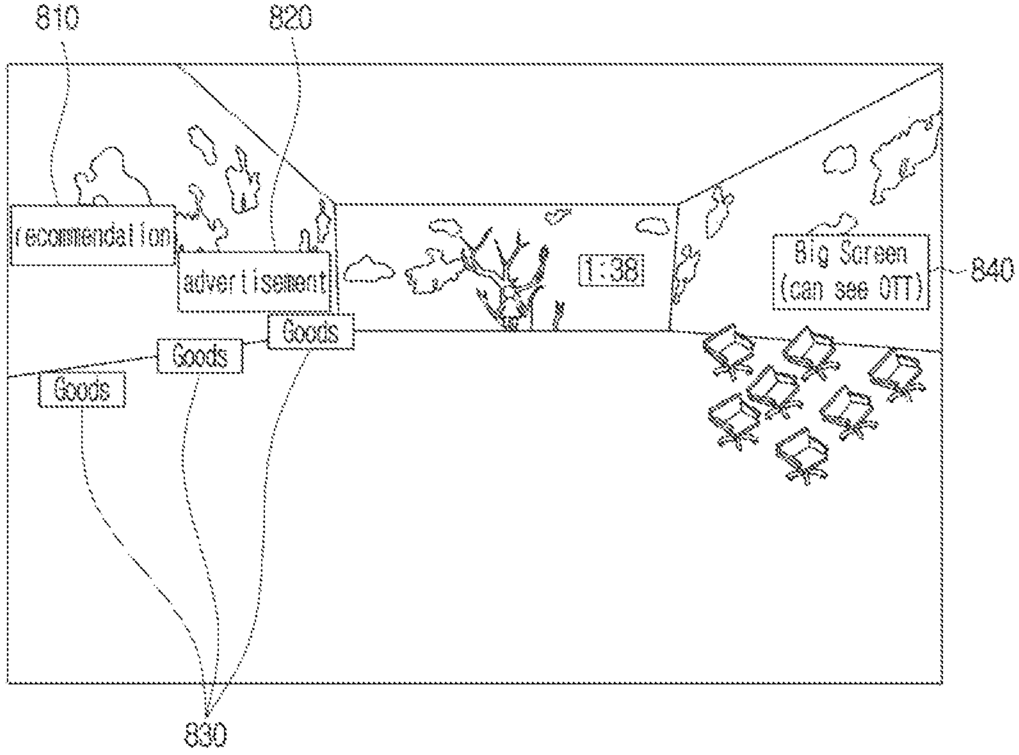
FIG. 8 is a diagram illustrating metaverse space that includes a plurality of areas, according to one or more embodiments.

The metaverse server 10-4 may divide the metaverse space into a plurality of areas, and provide information about recommended content, information about advertisement content, information for purchasing goods (at this time, product includes not only an actual product, but also a non-fungible token (NFT) product), and information about preferred content on the plurality of areas. For example, the metaverse server 10-4 may display at least one recommended content on a first area 810, at least one advertisement content on a second area 820, information associated with purchasing goods on a third area 830, and information about the preferred content at a fourth area 840 as shown in FIG. 8.

At this time, the recommended content, the advertisement content, and purchasable goods may be determined by the user profile stored in the user profile server 10-2. For example, if "AAA content" is determined as the preferred content through the user profile, the metaverse server 10-4 may provide the recommended content associated with the "AAA content," the advertisement content associated with the "AAA content," or goods associated with the "AAA content" within the metaverse space.

The metaverse server 10-4 may provide not only the recommended content, the advertisement content, service for purchasing goods, and information about the preferred content, but also other information (e.g., user schedule information, weather information, time information, etc.) together therewith.

The metaverse server 10-4 may store the generated metaverse in an endpoint database so as to be accessible to the electronic device 100.

Figure 9:
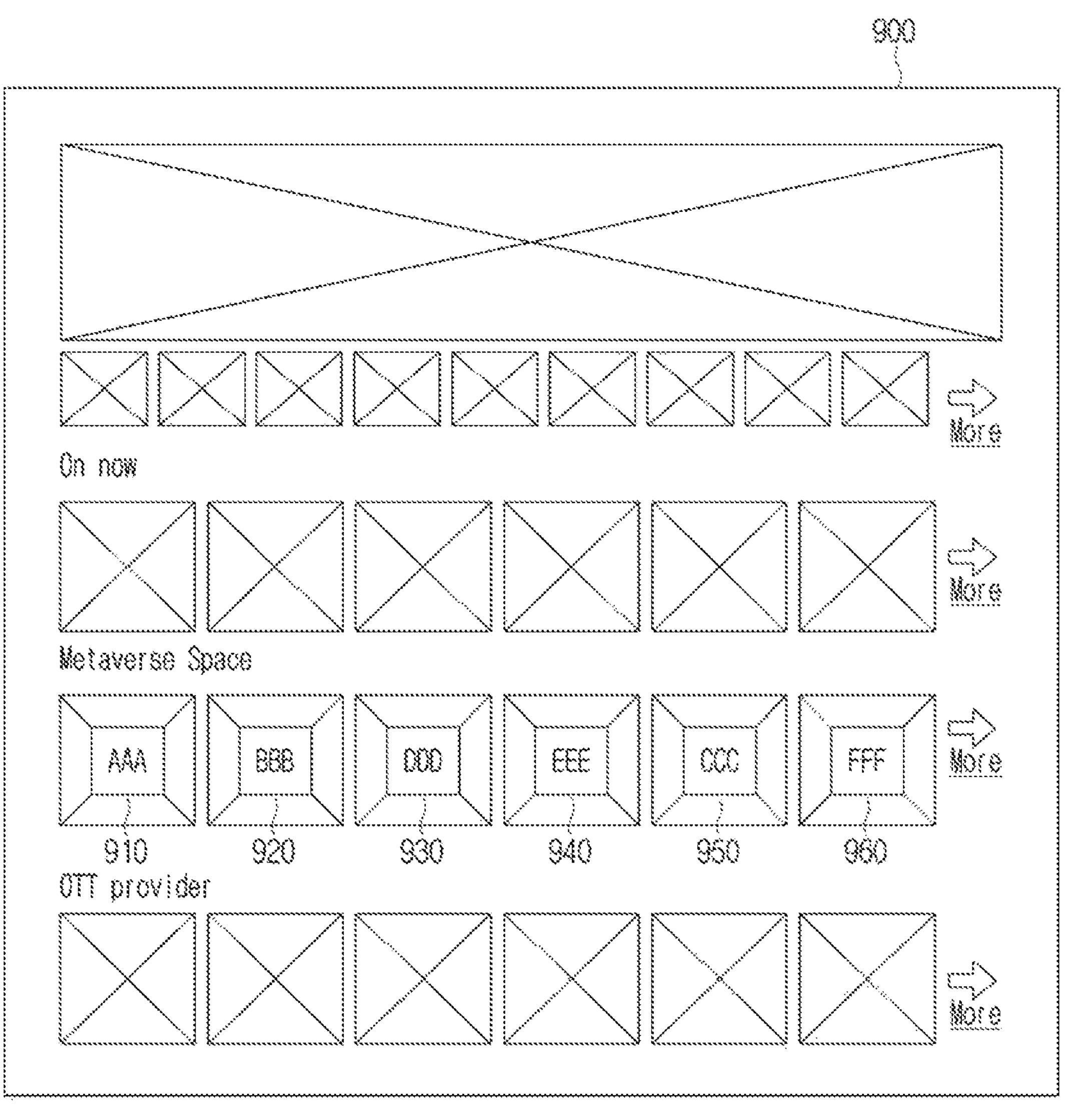
FIG. 9 is a diagram illustrating a UI for entering a metaverse space, according to one or more embodiments.

After the metaverse space is generated, the electronic device 100 may output a UI (S355). At this time, the generated UI may be the home UI through which the broadcast content, the game content, applications, and the metaverse space can be entered. Specifically, as shown in FIG. 9, the electronic device 100 may output a home UI 900 that includes a plurality of icons with which broadcast programs that are being provided currently can be viewed, and icons 910 to 960 with which a plurality of metaverse spaces associated with the preferred content of the user may be entered together with icons with which broadcast programs provided from OTT can be viewed. Each of the icons 910 to 960 with which the plurality of metaverse spaces can be entered may be include with title information, thumbnail information, or the like of the corresponding preferred content.

At this time, the icons 910 to 960 with which the plurality of metaverse spaces included in the home UI 900 can be entered may be arranged in an order of preference. That is, if preference for "AAA content" is the highest, the electronic device 100 may first output a first icon 910 with which the metaverse space associated with the "AAA content" can be entered over other icons 920 to 960.

In FIG. 9, according to one or more embodiments, the plurality of icons 910 to 960 with which the metaverse space can be entered is shown as displayed, but this is merely one embodiment, and only icons 910 and 920 with which the metaverse space corresponding to some preferred content can be entered may be displayed.

The electronic device 100 may receive input of the user command for entering the metaverse space (S360). Specifically, the electronic device 100 may receive input of a user command selecting one from among the icons with which the metaverse space included in the home UI 900 can be entered. For example, the electronic device 100 may receive input of a user command selecting the first icon 910 for entering the metaverse space associated with the "AAA content" from among the icons 910 to 960 with which the metaverse space included in the home UI 900 can be entered.

The electronic device 100 may request connection to the metaverse space to the metaverse server 10-4 to enter the selected metaverse space (S365).

The metaverse server 10-4 may provide data corresponding to the metaverse space to the electronic device 100 (S370). That is, the metaverse server 10-4 may provide data that corresponds to the metaverse space stored in the endpoint database accessible to the electronic device 100.

Figure 10:
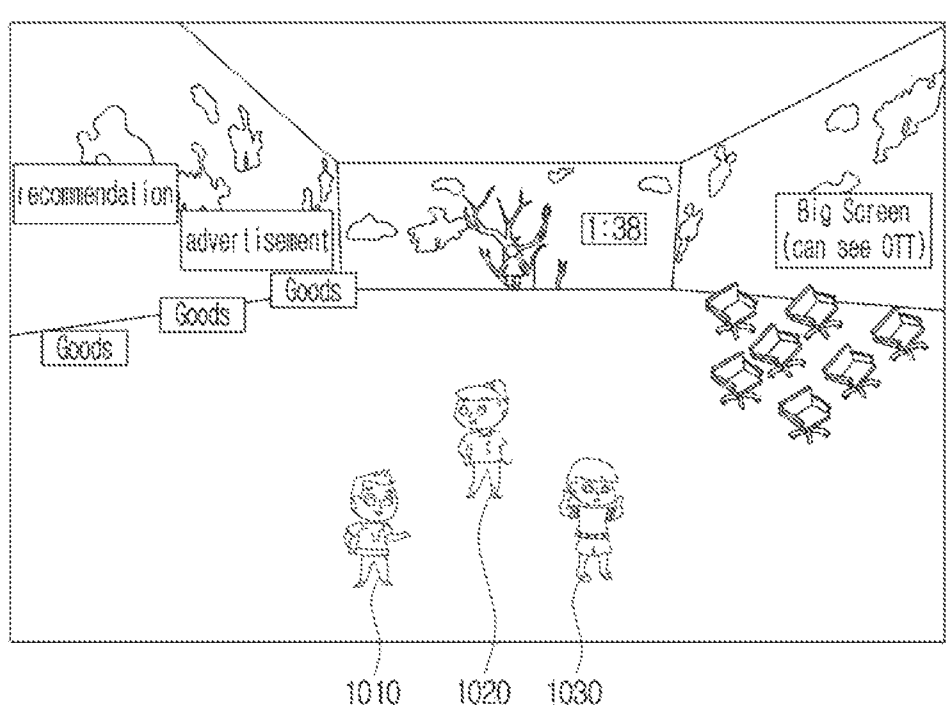
FIG. 10 is a diagram illustrating a metaverse space that includes a plurality of avatars corresponding to a plurality of users, according to one or more embodiments.

The electronic device 100 may output a screen of the metaverse space (S375). Specifically, the electronic device 100 may connect to the metaverse space stored in the endpoint database and output a screen of the metaverse space. At this time, in the metaverse space, an avatar 1010 corresponding to the user of the electronic device 100 together with a plurality of avatars 1020 and 1030 corresponding to other users with user profiles that include "AAA content" as the preferred content may be included may be included as shown in FIG. 10.

That is, the user of the electronic device 100 may perform communication with different other users through the avatar, and express his/her opinion through the avatar. For example, when a text is input through the electronic device 100, the electronic device 100 may output the text input within a speech balloon of a first avatar 1010. Alternatively, when a user of another electronic device inputs text, the electronic device 100 may output the text input by the another user within the speech balloon of a second avatar 1020.

When one from among UI elements corresponding to the recommended content, the advertisement content, the service for purchasing goods, and the like positioned in the metaverse space is selected, the electronic device 100 may provide the selected content or service. For example, when a UI element associated with the recommend content is selected, the electronic device 100 may output a screen including information associated with the selected recommended content or playback the selected recommended content. In another example, if a UI element associated with the service for purchasing goods is selected, the electronic device 100 may output a web page screen associated with the selected goods purchase.

As described above, by providing a metaverse space associated with the preferred content of the user through the electronic device 100, the user may be provided with various services through the metaverse space, and an immersive degree for use of the metaverse space may be increased. Additionally, service providers that provide the metaverse space may be able to provide various services through the metaverse space.

In the above-described embodiment, the metaverse space has been described as being generated as one metaverse space and a plurality of users connecting to the one metaverse space, but this is merely one embodiment, and a metaverse space may be generated for each user. At this time, if a metaverse space is generated for each user, the electronic device 100 may display a UI through which the metaverse space for each user can be entered, and the metaverse spaces of other users may be connected to through the UI. The electronic device 100 may perform customizing of a metaverse space of an individual according to a user input.

Some from among the operations performed by a plurality of servers 10 to 40 from among the above-described embodiments may be performed by the electronic device 100.

When utilizing an image of the preferred content and if the image of the preferred content cannot be utilized for reasons such as copyright, age use restriction, country use restriction, and the like, the metaverse server 10-4 may provide a UI guiding that the image of the preferred content cannot be used to the electronic device 100 or search alternative content of the preferred content, and generate a metaverse space using the alternative content.

Figure 11:
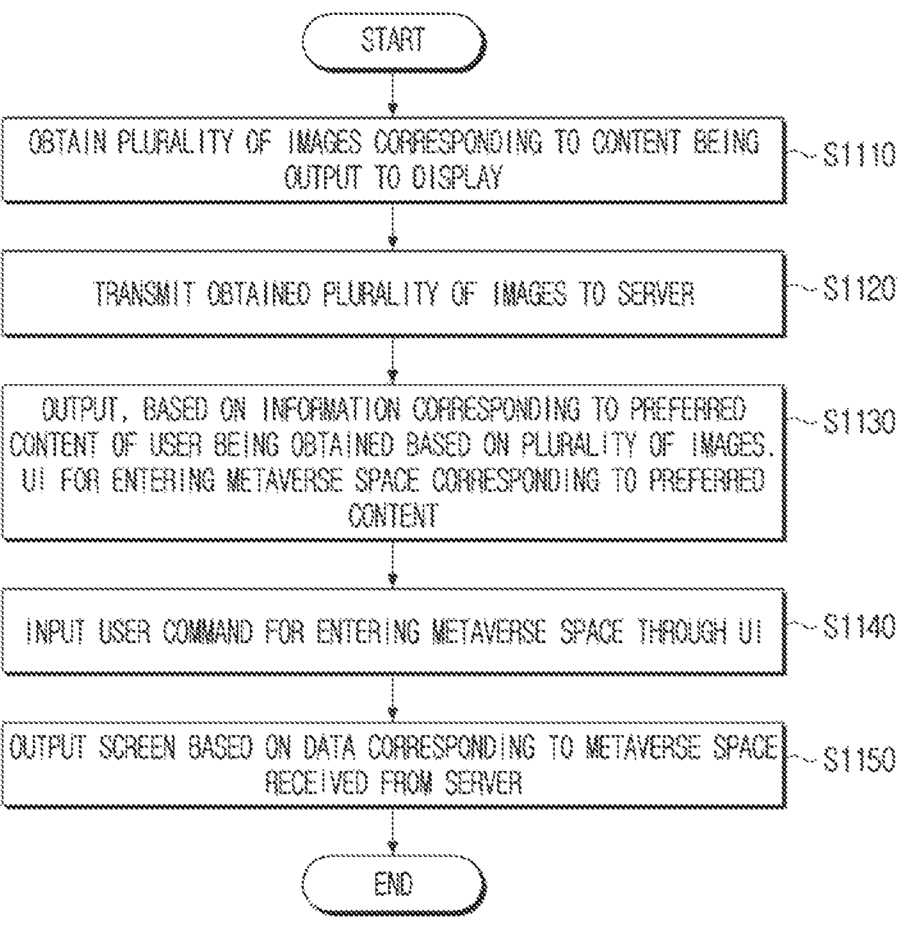
FIG. 11 is a flowchart illustrating a method for controlling an electronic device that provides a metaverse space, according to one or more embodiments.

FIG. 11 is a flowchart illustrating a method for controlling an electronic device that provides a metaverse space according to one or more embodiments.

The electronic device 100 may obtain a plurality of images corresponding to content being output to the display part 110 of the electronic device 100 (S1110). Specifically, the electronic device 100 may obtain a plurality of images by capturing a content screen being output to the display part 110 of the electronic device 100.

Then, the electronic device 100 may transmit the obtained plurality of images to the server 10-1 (S1120).

When information corresponding to the preferred content of the user is obtained based on the plurality of images, the electronic device 100 may output the UI for entering the metaverse space corresponding to the preferred content (S1130). At this time, the UI may be the home UI that includes at least one first icon corresponding to the at least one image content, at least one second icon corresponding to the at least one game content, a third icon corresponding to the at least one application, and at least one fourth icon corresponding to the at least one metaverse space. Specifically, when at least one playback content corresponding to the plurality of capture images is identified through the first server 10-1, the preferred content may be determined by the preference information about the identified at least one playback content. At this time, the preference information of the playback content may include score information calculated based on at least one from among a number of playback times and playtime time of the at least one playback content.

The electronic device 100 may receive input of the user command for entering the metaverse space through the UI (S1140). At this time, the user command for entering the metaverse space may be the user command selecting a fourth icon for the metaverse corresponding to the preferred content from among the at least one fourth icon included in the home UI.

The electronic device 100 may output a screen based on data corresponding to the metaverse space received from the server 10-4 (S1150). At this time, the metaverse space may be generated based on at least one image web crawled based on information about the preferred content. The metaverse space may be generated by 3D modelling the background area from among the background area and the object area included in the at least one image, and may include an avatar of the object included in the object area or the object image. The metaverse space may include at least one from among a first area which includes information about the recommended content of the user, a second area which includes information about the advertisement content provided to the user, and a third area for purchasing goods. The metaverse space may include a first avatar corresponding to the user and a second avatar corresponding to another user with a user profile that includes the preferred content.

A function associated with artificial intelligence (e.g., a learning function and an inference function of the neural network model) according to the disclosure may be operated through a processor and a memory of a server.

The processor may be configured of one or a plurality of processors. At this time, the one or the plurality of processors may include at least one from among a Central Processing Unit (CPU), a Graphic Processing Unit (GPU), and a Neural Processing Unit (NPU), but is not limited to the example of the above-described processor.

The CPU may be a generic-purpose processor capable of performing not only general computations but also artificial intelligence computations, and may execute a complex program effectively through a multi-layered cache structure. The CPU is advantageous in a series processing method that allows an organic connection of a previous calculation result and a following calculation result to be possible through sequential calculation. The generic-purpose processor is not limited to the above-described example except for when specified as the above-described CPU.

The GPU may be a processor for large-scale computations such as a floating point computation used in graphic processing, and may perform large-scale computations in parallel by aggregating the core in large amounts. Specifically, the GPU may be advantageous in a parallel processing method such as convolution computation compared to the CPU. The GPU may be used as an auxiliary processor (co-processor) for supplementing a function of the CPU. The processor for large amount computations is not limited to the above-described example except for when specified as the above-described GPU.

The NPU may be a processor specialized in artificial intelligence computations that use an artificial neural network, and may implement each layer that configure the artificial neural network with hardware (e.g., silicon). Because the NPU is designed specialized according to requirement specifications of a company, there is a lower degree of freedom compared to the CPU or the GPU, but the artificial intelligence computations demanded by companies may be effectively processed As a processor specializing in artificial intelligence computations, the NPU may be implemented as various forms such as, for example, and without limitation, a Tensor Processing Unit (TPU), an Intelligence Processing Unit (IPU), a Vision Processing Unit (VPU), and the like. The artificial intelligence processor is not limited to the above-described example except for when specified as the above-described NPU.

The one or the plurality of processors may be implemented as a System of Chip (SoC). At this time, the SoC may be further included with a memory in addition to the one or the plurality of processors, and a network interface such as Bus for data communication between the processor and the memory.

If the plurality of processors are included in the SoC included in the server, an electronic device 100 or the first server 10-1 may use some of the processors from among the plurality of processors and perform a computation associated with artificial intelligence (e.g., a computation associated with learning or inference of the artificial intelligence model). For example, the electronic device 100 or the first server 10-1 may perform a computation associated with artificial intelligence using at least one from among the GPU, the NPU, the VPU, the TPU, or a hardware accelerator specializing in artificial intelligence computation such as convolution computation, matrix multiplication computation, and the like from among the plurality of processors. However, this is merely one embodiment, and computations associated with artificial intelligence may be processed using a generic-purpose processor such as the CPU.

The server may perform a computation for a function associated with artificial intelligence using a multicore (e.g., dual core, quad core, etc.) included in one processor. Specifically, the server may perform artificial intelligence computations such as convolution computation and matrix multiplication computation in parallel using the multicore included in the processor.

The one or the plurality of processors may control so as to process input data according to a pre-defined operation rule or an artificial intelligence model stored in the memory. The pre-defined operation rule or the artificial intelligence model is characterized by being created through learning.

The being created through learning refers to a pre-defined operation rule or an artificial intelligence model of a desired feature being created by applying a learning algorithm to a plurality of learning data. The learning may be carried out by a machine itself in which the artificial intelligence according to the disclosure is performed, or through a separate server or system.

The artificial intelligence model may be configured of a plurality of neural network layers. At least one layer may have at least one weight value and perform computation of the layer through a computation result of a previous layer and at least one defined computation. Examples of the neural network include a Convolutional Neural Network (CNN), a Deep Neural Network (DNN), a Recurrent Neural Network (RNN), a Restricted Boltzmann Machine (RBM), a Deep Belief Network (DBN), a Bidirectional Recurrent Deep Neural Network (BRDNN), Deep Q-Networks, and a Transformer, and the neural network of the disclosure is not limited to the above-described example except for when specified.

The learning algorithm may be a method for training a predetermined target machine to make decisions or predictions on its own using the plurality of learning data. Examples of the learning algorithm may include a supervised learning, an unsupervised learning, a semi-supervised learning, or a reinforcement learning, and the learning algorithm of the disclosure is not limited to the above-described example unless otherwise specified.

In addition, a method according to the various embodiments of the disclosure may be provided included in a computer program product. The computer program product may be exchanged between a seller and a purchaser as a commodity. The computer program product may be distributed in the form of a machine-readable storage medium (e.g., a compact disc read only memory (CD-ROM)), or distributed online through an application store (e.g., PLAYSTORE™) or directly between two user devices (e.g., smartphones). In the case of one line distribution, at least a portion of the computer program product (e.g., downloadable app) may be stored at least temporarily in the storage medium readable by a machine such as a server of a manufacturer, a server of an application store, or a memory of a relay server, or temporarily generated.

A method according to the various embodiments of the disclosure may be implemented with software including instructions stored in a machine-readable storage media (e.g., computer). The machine may call an instruction stored in the storage medium, and as a device operable according to the called instruction, may include an electronic device according to the above-mentioned embodiments.

The machine-readable storage medium may be provided in the form of a non-transitory storage medium. Herein, 'non-transitory' merely means that the storage medium is a tangible device, and does not include a signal (e.g., electromagnetic waves), and the term does not differentiate data being semi-permanently stored or temporarily stored in the storage medium. In an example, the 'non-transitory storage medium' may include a buffer to which data is temporarily stored.

Based on the instruction being executed by the processor, the processor may directly or using other elements under the control of the processor perform a function corresponding to the instruction. The instruction may include a code generated by a compiler or executed by an interpreter.

While the disclosure has been illustrated and described with reference to various example embodiments thereof, it will be understood that the various example embodiments are intended to be illustrative, not limiting. It will be understood by those skilled in the art that various changes in form and details may be made therein without departing from the true spirit and full scope of the disclosure, including the appended claims and their equivalents.

What is claimed is:

1. An electronic device, comprising:

a display;

a communicator;

at least one memory; and at least one processor configured to:

obtain a plurality of images corresponding to content being provided to the display, based on information corresponding to a preferred content of a user being obtained based on the plurality of images transmitted to a server through the communicator, control the display to provide a user interface (UI) for entering a metaverse space corresponding to the preferred content, and based on a user command for entering the metaverse space being input through the UI, control the display to display a screen based on data corresponding to the metaverse space received from the server through the communicator, wherein the preferred content is determined, based on at least one playback content corresponding to the plurality of images being identified through the server, by preference information about the identified at least one playback content, and wherein the preferred content is determined based on the at least one playback content having score information, included in the preference information, that exceeds a threshold value, which is set differently according to the user.

2. The electronic device of claim 1, wherein the metaverse space is generated based on at least one image that is web crawled based on information about the preferred content.

3. The electronic device of claim 2, wherein the metaverse space is generated by 3-dimensional (3D) modeling a background area from among the background area and an object area comprised in the at least one image, and comprises an avatar of an object comprised in the object area or an object image.

4. The electronic device of claim 1, wherein the metaverse space comprises at least one from among a first area that includes information about a recommended content of the user, a second area that includes information about an advertisement content provided to the user, and a third area for purchasing goods.

5. The electronic device of claim 1, wherein the metaverse space comprises a first avatar corresponding to the user and a second avatar corresponding to another user with a user profile that includes the preferred content.

6. The electronic device of claim 1, wherein the UI is a home UI comprising at least one first icon corresponding to at least one image content, at least one second icon corresponding to at least one game content, at least one third icon corresponding to at least one application, and at least one fourth icon corresponding to at least one metaverse space, and wherein the user command for entering the metaverse space is a user command selecting a fifth icon for a metaverse space corresponding to the preferred content from among the at least one fourth icon included in the home UI.

7. The electronic device of claim 1, wherein the server is configured to:

based on the at least one playback content being a game content, obtain information about the game content by recognizing text included in an image through optical character recognition (OCR), and based on the at least one playback content being an image content, obtain information about the image content by recognizing a title of an image content corresponding to an image through automatic content recognition.

8. The electronic device of claim 1, wherein the information about the identified at least one playback content is stored in a database, wherein the preference information of the at least one playback content is obtained based on information about the at least one playback content stored in the database, and wherein the preference information of the at least one playback content comprises the score information determined based on at least one from among a number of playback times and playback time of the at least one playback content.

9. A control method of an electronic device, the control method comprising:

obtaining a plurality of images corresponding to content being provided to a display of the electronic device;

based on information corresponding to a preferred content of a user being obtained based on the plurality of images transmitted to a server, providing a user interface (UI) for entering a metaverse space corresponding to the preferred content; and based on a user command for entering the metaverse space being input through the UI, providing a screen based on data corresponding to the metaverse space received from the server, wherein the preferred content is determined, based on at least one playback content corresponding to the plurality of images being identified through the server, by preference information about the identified at least one playback content, and wherein the preferred content is determined based on the at least one playback content having score information, included in the preference information, that exceeds a threshold value, which is set differently according to the user.

10. The control method of claim 9, wherein the metaverse space is generated based on at least one image that is web crawled based on information about the preferred content.

11. The control method of claim 10, wherein the metaverse space is generated by 3-dimensional (3D) modeling a background area from among the background area and an object area comprised in the at least one image, and comprises an avatar of an object comprised in the object area or an object image.

12. The control method of claim 9, wherein the metaverse space comprises at least one from among a first area that includes information about a recommended content of the user, a second area that includes information about an advertisement content provided to the user, and a third area for purchasing goods.

13. The control method of claim 9, wherein the metaverse space comprises a first avatar corresponding to the user and a second avatar corresponding to another user with a user profile that comprises the preferred content.

14. The control method of claim 9, wherein the UI is a home UI comprising at least one first icon corresponding to at least one image content, at least one second icon corresponding to at least one game content, at least one third icon corresponding to at least one application, and at least one fourth icon corresponding to at least one metaverse space, and wherein the user command for entering the metaverse space is a user command selecting a fifth icon for a metaverse space corresponding to the preferred content from among the at least one fourth icon included in the home UI.

15. An electronic device, comprising:

at least one memory; and at least one processor configured to:

obtain a plurality of images corresponding to content being provided to a display, based on information corresponding to a preferred content of a user being obtained based on the plurality of images transmitted to a server, control the display to provide a user interface (UI) for entering a metaverse space corresponding to the preferred content, and based on a user command for entering the metaverse space being input through the UI, control the display to display a screen based on data corresponding to the metaverse space received from the server, wherein the preferred content is determined, based on at least one playback content corresponding to the plurality of images being identified through the server, by preference information about the identified at least one playback content, and wherein the preferred content is determined based on the at least one playback content having score information, included in the preference information, that exceeds a threshold value, which is set differently according to the user.

16. The electronic device of claim 15, wherein the metaverse space is generated based on at least one image that is web crawled based on information about the preferred content.

17. The electronic device of claim 16, wherein the metaverse space is generated by 3-dimensional (3D) modeling a background area from among the background area and an object area included in the at least one image, and wherein the metaverse space comprises an avatar of an object included in the object area or an object image.

18. The electronic device of claim 15, wherein the metaverse space comprises at least one from among a first area that includes information about a recommended content of the user, a second area that includes information about an advertisement content provided to the user, and a third area for purchasing goods.

19. The electronic device of claim 15, wherein the metaverse space comprises a first avatar corresponding to the user and a second avatar corresponding to another user with a user profile that includes the preferred content.

* * * * *